(12) United States Patent
Widegren

(10) Patent No.: US 10,361,007 B2
(45) Date of Patent: Jul. 23, 2019

(54) METHOD OF MAKING A NUCLEAR FUEL PELLET FOR A NUCLEAR POWER REACTOR

(71) Applicant: WESTINGHOUSE ELECTRIC SWEDEN AB, Västerås (SE)

(72) Inventor: Hans Widegren, Västerås (SE)

(73) Assignee: Westinghouse Electric Sweden AB, Vasteras (SE)

( * ) Notice: Subject to any disclaimer, the term of this patent is extended or adjusted under 35 U.S.C. 154(b) by 171 days.

(21) Appl. No.: 15/509,037

(22) PCT Filed: Apr. 24, 2015

(86) PCT No.: PCT/EP2015/058938
§ 371 (c)(1),
(2) Date: Mar. 6, 2017

(87) PCT Pub. No.: WO2016/037712
PCT Pub. Date: Mar. 17, 2016

(65) Prior Publication Data
US 2017/0271034 A1    Sep. 21, 2017

Related U.S. Application Data

(60) Provisional application No. 62/047,323, filed on Sep. 8, 2014.

(51) Int. Cl.
*G21C 21/02* (2006.01)
*G21C 3/04* (2006.01)
(Continued)

(52) U.S. Cl.
CPC ............. *G21C 21/02* (2013.01); *G21C 3/044* (2013.01); *G21C 3/334* (2013.01); *G21C 3/623* (2013.01); *Y02E 30/38* (2013.01)

(58) Field of Classification Search
CPC ........ G21C 21/02; G21C 3/044; G21C 3/334; G21C 3/623
(Continued)

(56) References Cited

U.S. PATENT DOCUMENTS

| 4,401,608 A | 8/1983 | Smith | |
| 2010/0091933 A1* | 4/2010 | Song | G21C 21/02 |
| | | | 376/414 |

(Continued)

FOREIGN PATENT DOCUMENTS

| DE | 3235944 A1 | 5/1983 |
| EP | 1909294 A1 | 4/2008 |

(Continued)

OTHER PUBLICATIONS

Rondinella et al. "The high burn-up structure in nuclear fuel" Materials Today, Dec. 2010 (Dec. 1, 2010), pp. 24-32, vol. 13, No. 12.

(Continued)

*Primary Examiner* — Jack W Keith
*Assistant Examiner* — Daniel Wasil
(74) *Attorney, Agent, or Firm* — Murtha Cullina LLP

(57) ABSTRACT

A method of making a nuclear fuel pellet for a nuclear power reactor. The method includes: providing a nuclear fuel material in powder form, pressing the powder such that a green pellet is obtained; providing a liquid that comprises an additive which is to be added to the green pellet; contacting the green pellet with the liquid so the liquid, with the additive, penetrates into the pellet; and sintering the treated green pellet. The additive is such that larger grains in the nuclear fuel material are obtained with the additive.

19 Claims, 2 Drawing Sheets

(51) Int. Cl.
*G21C 3/62* (2006.01)
*G21C 3/334* (2006.01)

(58) Field of Classification Search
USPC .................................................. 376/261, 421
See application file for complete search history.

(56) References Cited

U.S. PATENT DOCUMENTS

2012/0098149 A1* 4/2012 Yang ..................... G21C 21/02
264/0.5
2013/0240805 A1* 9/2013 Kang ..................... G21C 3/623
252/638
2014/0185731 A1 7/2014 Kim et al.

FOREIGN PATENT DOCUMENTS

| JP | S50-027552 | A | 9/1975 |
| JP | H06-094869 | A | 4/1994 |
| JP | H11-211871 | A | 8/1999 |
| WO | 00/49621 | A1 | 8/2000 |
| WO | 2005/041208 | A2 | 5/2005 |

OTHER PUBLICATIONS

International Search Report for International Application No. PCT/EP2015/058938, dated Jul. 24, 2015.
Notice of Reasons for Rejection issued in corresponding Japanese Application No. 2017-510636, dated Nov. 6, 2018, pp. 1-4.

* cited by examiner

METHOD OF MAKING A NUCLEAR FUEL PELLET FOR A NUCLEAR POWER REACTOR

FIELD

The present invention concerns a method of making a nuclear fuel pellet for a nuclear power reactor.

BACKGROUND

Different manners of producing nuclear fuel pellets are known by a person skilled in the art. It is common to make the nuclear fuel pellet from a nuclear fuel material in powder form. The nuclear fuel material may for example be $UO_2$, where U is enriched with regard to $^{235}U$. The powder material may also include other additives, such as $U_3O_8$ and binder material. The powder is pressed in order to form a so-called green pellet. The concept "green pellet" in this technical field means the pressed pellet before it is sintered. The green pellet is thus thereafter sintered in a furnace. The sintered pellets are thereafter ground in order to obtain the correct diameter and surface finish.

It is also known to include some additives in the powder in order to increase the grain size in the sintered pellet. For example WO 00/49621 A1 gives some examples of such additives and describes how the nuclear fuel pellet may be produced.

DE 3235944 A1 describes that a solution of hydrogen peroxide is added to the uranium dioxide powder in order to increase the grain size.

WO 2005/041208 A2 describes that a porous uranium dioxide arrangement is in-filtrated with a precursor liquid in the form of allylhydridopolycarbosilane in order to enhance the thermal conductivity in the nuclear fuel.

As a background of the present invention a further phenomenon should be mentioned. This phenomenon is a structure in the used nuclear fuel pellets called high burn-up structure (HBS) or rim structure. When the nuclear fuel has been used for a longer time in a nuclear reactor (i.e. a high burn-up) a new restructured configuration appears at the outer thin region of the fuel pellet. This phenomenon is described for example in the article "The high burn-up structure in nuclear fuel" by V. V. Rondinella et al. in Materials Today, December 2010, Volume 13, No. 12, pages 24-32. The HBS means that the grains in the outer region of the nuclear fuel pellet subdivide into very small grains. The outer region in which the HBS appears may for example be less than 100 μm thick.

SUMMARY

When in this document a certain percentage of a material is mentioned, this concerns weight percent, if nothing else is said.

When in this document a certain grain size is mentioned, this refers to the so-called two dimensional (2D) grain size, i.e. the grain size measured in a plane, if nothing else is said.

An object of the present invention is to provide a method of making a nuclear fuel pellet, with which method it is possible to better control the addition of an additive to the nuclear fuel pellet, which additive increases the grain size. A further object is to provide such a method which can be carried out in a relatively simple manner.

At least the above objects are achieved by a method of making a nuclear fuel pellet for a nuclear power reactor, the method comprising the following steps:

providing a nuclear fuel material in powder form;
pressing the powder such that a so-called green pellet is obtained;
providing a liquid that comprises an additive which is to be added to the green pellet;
contacting the green pellet with the liquid such that the liquid, with the additive, penetrates into the pellet; and
sintering the so treated green pellet,
wherein said additive is such that larger grains in the nuclear fuel material are present in the pellet after the sintering step as compared with the grain size obtained if a pellet to which no such additive has been added is sintered in the same manner.

According to the invention, the additive which increases the grain size is thus added after the green pellet has been formed. It is therefore not necessary to add the additive to the powder before pressing the green pellet. Since the additive is provided in a liquid, it can be controlled to which extent the additive enters into the green pellet. An improved control of the addition of the additive which increases the grain size is therefore achieved. Furthermore, it is quite easy to apply the liquid, with additive, to the green pellet.

According to one manner of carrying out the method according to the invention, said additive is in the form of particles dispersed in said liquid. The additive is thus in the form of particles which may penetrate into the pores in the green pellet. It is advantageous to use a liquid as a carrier of such particles. Since the particles are dispersed in the liquid, the particles do not dissolve in the liquid.

According to a further manner of carrying out the method according to the invention, the method comprises a step of controlling the penetration depth of the liquid, and thereby of the additive, into the green pellet. By controlling the penetration depth, it is possible to control in which region in the pellet the liquid, with the additive, is present. It is thereby possible to control where the additive is present in the pellet.

According to a further manner of carrying out the method according to the invention, said step of controlling the penetration depth is done by selecting one or both of the following:

the viscosity of the liquid with included additive,
the amount of the liquid, with the additive, which is added to the green pellet when contacting the green pellet with the liquid, with the additive. By selecting a liquid with a certain viscosity it is possible to control the penetration depth of the liquid. The penetration depth may also be controlled by controlling how much liquid is added to the green pellet. The penetration depth can also be controlled by selecting a certain particle size for the additive particles or by selecting a certain particle size distribution. Smaller particles tend to penetrate deeper into the green pellet than larger particles.

The amount of the liquid, with the additive, which is added to the green pellet can be controlled for example by spraying a certain amount of the liquid, with additive, onto the green pellet, or by exposing the green pellet to the liquid, with additive (for example by dipping the green pellet in the liquid, with additive) during a predetermined time.

According to a further manner of carrying out the method according to the invention, the penetration depth of the liquid, with the additive, into the green pellet is controlled such that an outer portion of the green pellet contains substantially more liquid, and thereby more additive, than an inner portion of the green pellet, such that the sintered pellet has a larger grain size in the outer portion than in the inner portion. It is thus possible to control the grain size to be larger in an outer portion of the sintered pellet. The inventors of the present invention have realized that the occurrence of the above described HBS may be prevented, or delayed, if the nuclear fuel pellet has larger grains in the outer portion of the nuclear fuel pellet (where the HBS occurs).

The outer and inner portions may be defined in different manners. For example, if we consider a cylindrical nuclear fuel pellet with a radius r, the inner portion may for example be the part of the nuclear fuel pellet from the centre of the pellet outwards up to for example 0.6 r and the outer portion may for example be the part of the nuclear fuel pellet that is located between 0.8 r and r or between 0.9 r and r, or between 0.95 r and r (depending on where it is desired that the grains are larger). When it is stated that the grain size is larger in the outer portion, also this may be defined in different manners. For example, if we consider the average 2D grain size in the outer portion and the average 2D grain size in the inner portion, the average grain size in the outer portion may be at least 50%, preferably at least 100%, larger than the average grain size in the inner portion.

According to a further manner of carrying out the method according to the invention, said liquid with additive is selected and said method is performed such that the liquid with additive will penetrate into the pores which exist between the grains in the green pellet. The green pellet will have pores both between the grains in the green pellet and inside the grains in the green pellet. The pores inside the grains are normally smaller than the pores which exist between the grains. Consequently, it can be controlled (for example by selecting a certain viscosity) that the liquid will penetrate into the pores which exist between the grains.

According to a further manner of carrying out the method according to the invention, said liquid with additive is selected and said method is performed such that the liquid with additive will not, at least not to any substantial degree, penetrate into the pores which exist in the grains in the green pellet. According to this alternative, the additive will not to any substantial degree enter into the grains, but the additive will be added into the pores which exist between the grains.

According to a further manner of carrying out the method according to the invention, said liquid with additive is selected and said method is performed such that the liquid with additive will penetrate also into the pores which exist in the grains in the green pellet. According to this alternative, the additive will thus enter also into the pores in the grains. With the present invention it is thus possible to control where in the green pellet the additive is added.

According to a further manner of carrying out the method according to the invention, said liquid is selected and said method is performed such that the liquid will completely, or at least to 99%, leave the pellet before or during the sintering step. Since the liquid will leave the pellet, the liquid (and the material which constitutes the liquid) will not be present in the sintered pellet. Consequently, the liquid acts as a carrier of the additive and will not influence the properties of the produced pellet.

Preferably, the liquid leaves the pellet during a step of heating the pellet. This can either be a separate heating step before the sintering step or the heating that is performed during the sintering step. The latter alternative has the advantage that no separate heating step is necessary.

According to a further manner of carrying out the method according to the invention, said additive constitutes or includes a substance which causes said larger grains in the sintered pellet, wherein said substance is selected and the method is performed such that the substance completely, or at least to 90%, preferably to at least 95%, more preferred to at least 99%, leaves at least an outer portion of the pellet before and/or during the sintering step. Some additives may affect the neutron economy, i.e. they may absorb neutrons. On the other hand, as explained above, large grains, at least in the outer portion of the nuclear fuel pellet, are advantageous in order to prevent the HBS. It may therefore be an advantage to use a substance that leaves the pellet before or during the sintering step (but that causes the larger grains). This is also made easier by the present invention, since with the present invention, the additive may be added only to an outer portion of the pellet. If the additive is only present in an outer portion, it is easier to make the additive leave the pellet, for example during a heating step, such as the sintering step.

It will now be explained why it is stated that the substance causes the larger grains. The substance may be included in a compound, such that the additive is a compound which includes the substance which causes the larger grains. The rest of the compound may act primarily as a carrier of the substance which causes the larger grains. For example, the additive may be $UB_4$. In this case the B will cause the larger grains, but the U as such in the compound $UB_4$ will not substantially contribute the larger grains. This is thus the reason why it is stated in the claim that the substance causes the larger grains. The substance is preferably a chemical element, for example B or Cr. The additive may include more than one such substance.

According to a further manner of carrying out the method according to the invention, said additive is made of, or comprises, B and/or Cr. These materials are advantageous substances that will increase the grain size.

The additive comprising B may for example be $UB_4$, $B_4C$, $ZrB_2$ or just B.

The additive comprising Cr may preferably be is the form of a chromium oxide, such as $CrO$, $CrO_2$ and/or $Cr_2O_3$.

According to a further manner of carrying out the method according to the invention, said additive comprises B and wherein at least 90% of said B is $^{11}B$. B in the form of the isotope $^{10}B$ acts as a neutron absorber. However, if the purpose of the added B is to increase the grain size, but not to act as a neutron absorber, then it is preferable to use the isotope $^{11}B$, since if some B remains in the sintered pellet, this B will in this case not act as a neutron absorber.

The B may, for example, be selected such that it in said additive to at least 98% is present in the form of the isotope $^{11}B$.

According to a further manner of carrying out the method according to the invention, said liquid is selected such that the additive does not dissolve in the liquid, and such that the nuclear fuel material in the green pellet is not dissolved by the liquid. It is preferable that the liquid does not interact with the additive or the green pellet in such a manner that the additive or the green pellet is dissolved by the liquid.

According to a further manner of carrying out the method according to the invention, said liquid is an oil, preferably a mineral oil. Such liquids have advantageous properties for acting as a carrier for the additive. Furthermore, by selecting a suitable mineral oil, a suitable viscosity is achieved.

The invention also concerns a method of making and using nuclear fuel. This method comprises:

making a plurality of nuclear fuel pellets according to any one of the preceding manners, arranging the nuclear fuel pellets in cladding tubes, arranging the cladding tubes, with the nuclear fuel pellets, in the core of a nuclear power reactor in a nuclear power plant, such that at least 20%, preferably at least 50%, most preferred 100%, of the nuclear fuel material in said core are made of pellets made in accordance with any one of the preceding manners, operating the nuclear reactor to produce energy.

By using the advantageous nuclear fuel pellets obtained with the method according to the present invention in a real nuclear power reactor, the advantages of the produced nuclear fuel are thus achieved in a nuclear power reactor plant for producing energy. The nuclear power reactor preferably comprises several thousand cladding tubes comprising nuclear fuel pellets produced with the method according to the present invention.

DETAILED DESCRIPTION

Since a person skilled in the art knows how to produce nuclear fuel pellets from a powder, all the details of such a method will not be described herein. However, the main steps which are relevant to the present invention are described.

Figure 1:
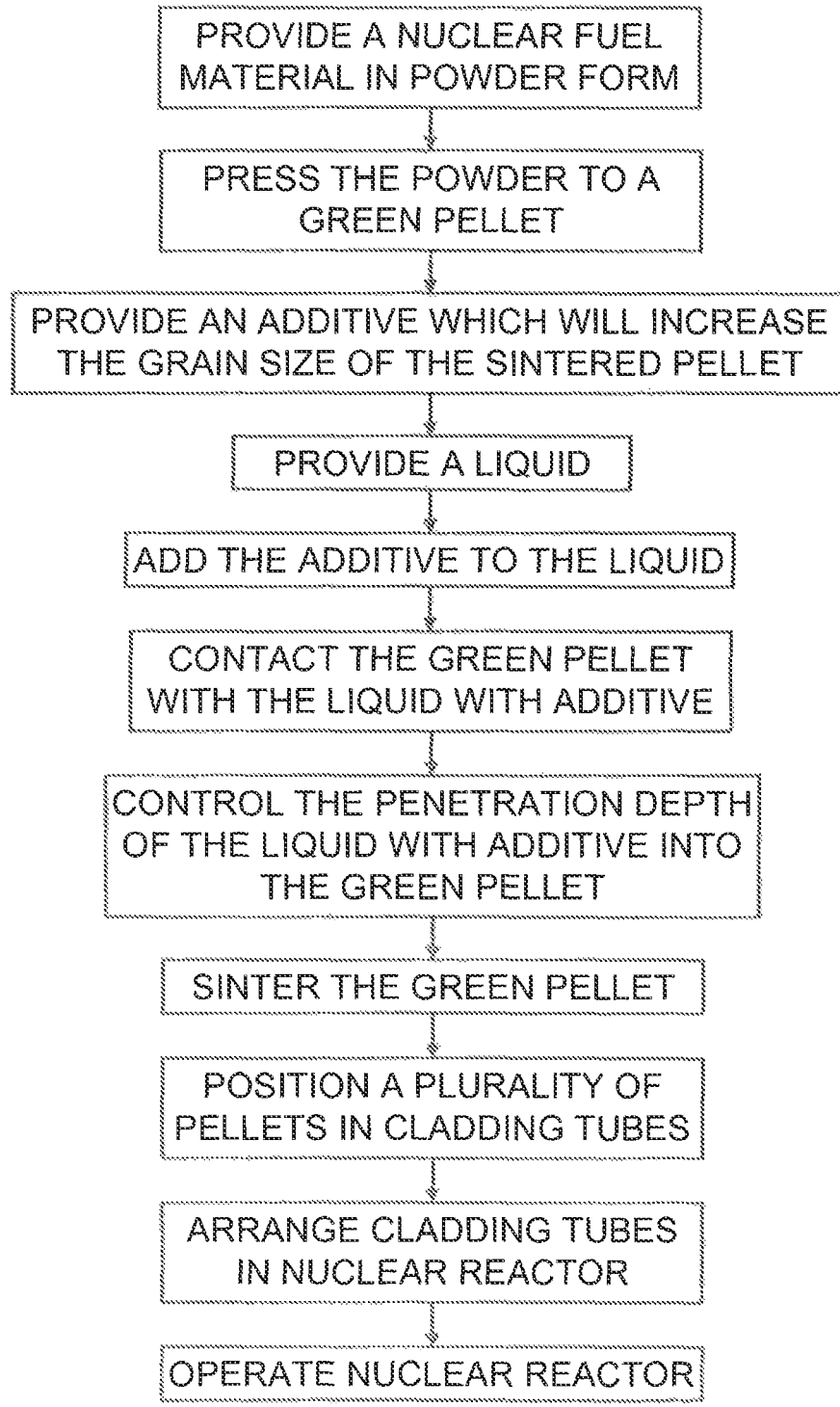
FIG. 1 shows schematically a flow chart of a manner of carrying out the method according to the invention.

FIG. 1 shows schematically the main steps of a manner of carrying out the method according to the present invention.

A nuclear fuel material in powder form is provided. The nuclear fuel material may be based on $UO_2$, which is enriched concerning $^{235}U$. The powder may also comprise other materials, for example binder materials, $U_3O_8$, burnable neutron absorbers, pore formers and sintering aid. The powder may contain at least 60%, preferably at least 80%, $UO_2$.

The powder is pressed such that a "green" pellet is formed. The green pellet will be porous. For example 50% of the pressed pellet may consist of pores.

An additive is provided. The additive is such that it will increase the grain size of the sintered pellet. The additive may for example comprise B (which will cause larger grains), for example in the form of $UB_4$. According to one embodiment, the B is in the form of $^{11}B$.

According to another alternative, the additive may be $Cr_2O_3$.

The additive is preferably in the form of particles, i.e. a powder. The size of the particles should be small enough so that the particles can penetrate into the pores in the green pellet, into which it is intended that the particles should penetrate. The particle size may for example be about 1 μm.

A liquid is provided. The liquid may be a mineral oil. The mineral oil may be selected to have a desired viscosity, for example a kinematic viscosity of 320 centistokes.

The additive is mixed with the liquid. Preferably, the additive particles are dispersed in the liquid, i.e. the liquid is selected such that the additive particles do not dissolve in the liquid, and also such that the nuclear fuel material in the green pellet is not dissolved by the liquid.

The green pellet is brought into contact with the liquid with the additive. The green pellet may for example be dipped into the liquid with additive or the liquid with additive may be sprayed onto the green pellet.

The penetration depth of the liquid, and thereby of the additive, into the green pellet is controlled. This can be done by selecting a suitable viscosity of the liquid or by controlling the amount of liquid, with the additive, which is added to the green pellet. This can be done for example by spraying a certain amount of the liquid onto the pellet or by dipping the green pellet in the liquid, with additive, during a predetermined time. It is also possible to control the penetration depth by the particle size or the particle size distribution.

According to one manner of carrying out the method according to the present invention, the penetration depth is controlled such that the additive is added only to an outer portion of the green pellet.

By controlling for example the viscosity of the liquid, with the additive, or the size of the additive particles, it is also possible to control into which pores in the green pellet that the additive will enter. For example, it may be controlled that the additive will substantially only enter into the pores which exist between the grains in the green pellet. Alternatively, it may be controlled that the additive will enter also into the pores which exist in the grains in the green pellet.

The so treated green pellet is then sintered. This can be done by a normal sintering process, for example in a furnace which contains different zones where the pellet is heated up to a final temperature of about 1800° C.

The liquid is preferably selected such that it will evaporate during the heating process. There may be a separate heating step before the actual sintering in order to evaporate the liquid. However, no such separate heating step may be necessary, since the liquid will evaporate during the sintering process.

According to one manner of carrying out the method according to the invention, also the substance that causes the larger grains in the sintered pellet will leave the pellet (evaporate) during a heating process, for example during the sintering step.

When it is desired to increase the grain size in the whole nuclear fuel pellet, the additive, and the viscosity of the liquid, may be selected such that the whole pellet is infiltrated with the liquid with the additive. However, as explained above, it is possible to control the penetration depth of the liquid with the additive. According to a preferred manner of carrying out the present invention, the penetration depth is controlled such that the additive will substantially enter only into an outer peripheral portion of the green pellet. When the green pellet is then sintered, larger grains will be obtained mainly in an outer portion of the pellet.

Figure 2:
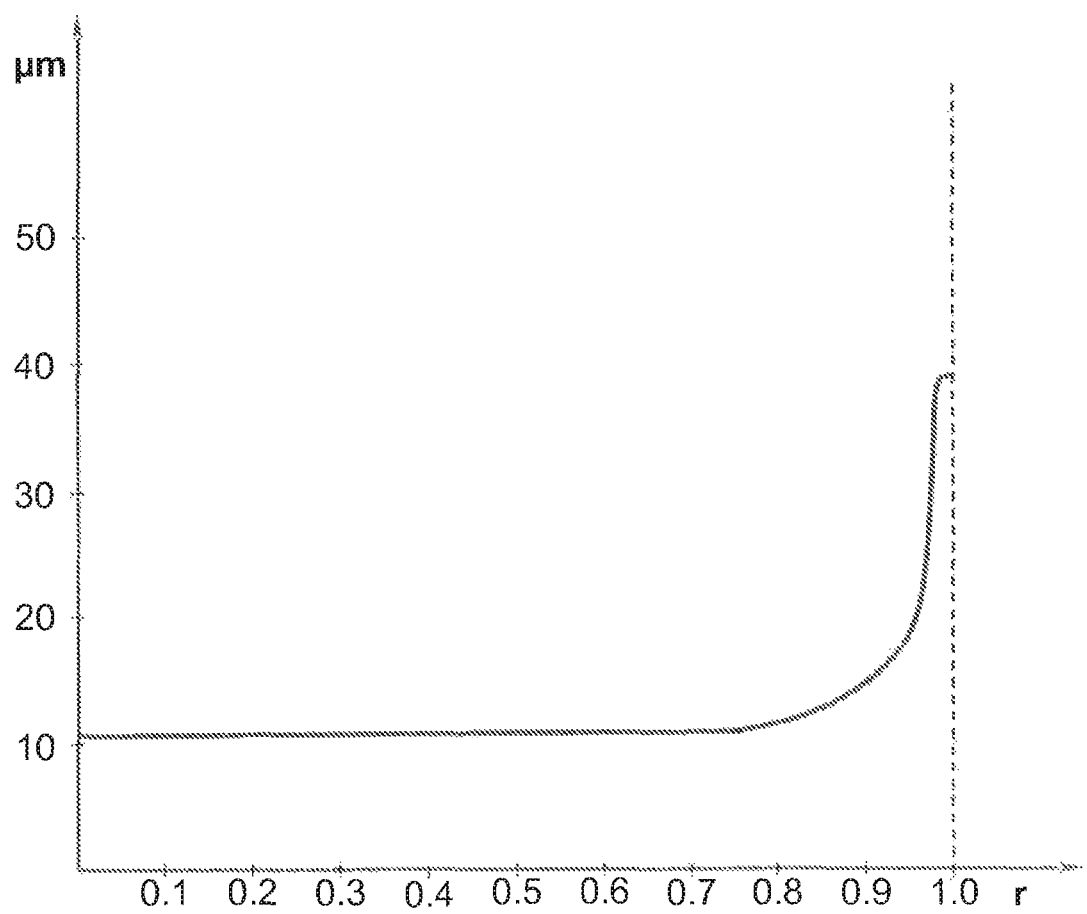
FIG. 2 shows schematically an example of how the grain size in a pellet produced in accordance with the present invention may vary in the radial direction of the pellet.

FIG. 2 illustrates schematically how the grain size may vary in a pellet treated in this manner. The x-axis shows the radius of the sintered pellet. The radius r 1.0 is thus the outer periphery of the pellet. The radius of the pellet may for example be about 4.6 mm. The y-axis in FIG. 2 shows the average 2D grain size. The curve in FIG. 2 thus shows how the average 2D grain size varies with the radius. FIG. 2 thus illustrates that according to this embodiment of the invention, a substantially larger grain size is obtained in the outer portion of the sintered pellet. This has in particular the advantage that the occurrence of the above described HBS can be prevented or delayed.

A plurality of nuclear fuel pellets are produced according to the method of the present invention.

The produced pellets are arranged in cladding tubes.

The cladding tubes are arranged in the core of a nuclear power reactor, such that the core includes several thousand cladding tubes with pellets produced in accordance with the present invention.

The nuclear reactor is operated in order to produce energy.

The present invention is not limited to the examples described herein, but can be varied and modified within the scope of the following claims.

The invention claimed is:

1. A method of making a nuclear fuel pellet for a nuclear power reactor, the method comprising the following steps:
providing a nuclear fuel material in powder form, wherein the nuclear fuel material is based on $UO_2$;
pressing the powder thereby obtaining a green pellet is obtained;
providing a liquid that comprises an additive which is to be added to the green pellet, the additive comprises B and/or Cr;
contacting the green pellet with the liquid wherein the liquid, with the additive, penetrates into the pellet; and
sintering the so treated green pellet,
wherein with said additive larger grains in the nuclear fuel material are present in the pellet after the sintering step as compared with the grain size obtained if the additive had not been added but otherwise produced in the same manner.

2. A method according to claim 1, wherein said additive is in the form of particles dispersed in said liquid.

3. A method according to claim 1, comprising a step of controlling the penetration depth of the liquid, and thereby of the additive, into the green pellet.

4. A method according to claim 3, wherein said step of controlling the penetration depth is done by selecting one or both of the following:
the viscosity of the liquid with included additive,
the amount of the liquid, with the additive, which is added to the green pellet when contacting the green pellet with the liquid, with the additive.

5. A method according to claim 3, wherein the penetration depth of the liquid, with the additive, into the green pellet is controlled to obtain an outer portion of the green pellet containing substantially more liquid, and thereby more additive, than an inner portion of the green pellet, wherein the sintered pellet has a larger grain size in the outer portion than in the inner portion.

6. A method according to claim 1, wherein said liquid with additive is selected and said method is performed wherein the liquid with additive will penetrate into the pores which exist between the grains in the green pellet.

7. A method according to claim 6, wherein said liquid with additive is selected and said method is performed wherein the liquid with additive will not penetrate into the pores which exist in the grains in the green pellet.

8. A method according to claim 6, wherein said liquid with additive is selected and said method is performed wherein the liquid with additive will penetrate also into the pores which exist in the grains in the green pellet.

9. A method according to claim 1, wherein said liquid is selected and said method is performed wherein at least 99% of the liquid will leave the pellet before or during the sintering step.

10. A method according to claim 1, wherein said additive constitutes or includes a substance which causes said larger grains in the sintered pellet, wherein said substance is selected and the method is performed wherein at least 90% of the substance leaves at least an outer portion of the pellet before and/or during the sintering step.

11. A method according to claim 10, wherein at least 95% of the substance leaves at least an outer portion of the pellet before and/or during the sintering step.

12. A method according to claim 11, wherein at least 99% of the substance leaves at least the outer portion of the pellet before and/or during the sintering step.

13. A method according to claim 12, wherein the substance completely leaves at least the outer portion of the pellet before and/or during the sintering step.

14. A method according to claim 1, wherein said additive comprises B and wherein at least 90% of said B is $^{11}B$.

15. A method according to claim 1, wherein said liquid is selected so the additive does not dissolve in the liquid, and wherein the nuclear fuel material in the green pellet is not dissolved by the liquid.

16. A method according to claim 1, wherein said liquid is an oil, preferably a mineral oil.

17. A method of making and using nuclear fuel, comprising:
making a plurality of nuclear fuel pellets according to the method of claim 1;
arranging the nuclear fuel pellets in cladding tubes;
arranging the cladding tubes, with the nuclear fuel pellets, in the core of a nuclear power reactor in a nuclear power plant, wherein at least 20% of the nuclear fuel material in said core are made of pellets made in accordance with the aforementioned method of making the plurality of nuclear fuel pellets; and
operating the nuclear reactor to produce energy.

18. A method of making and using nuclear fuel according to claim 17,
wherein at least 50% of the nuclear fuel material in said core are made of pellets made in accordance with the aforementioned method of making the plurality of nuclear fuel pellets.

19. A method of making and using nuclear fuel according to claim 18,
wherein 100% of the nuclear fuel material in said core are made of pellets made in accordance with the aforementioned method of making the plurality of nuclear fuel pellets.

* * * * *